(12) United States Patent
Maillard

(10) Patent No.: US 6,175,378 B1
(45) Date of Patent: Jan. 16, 2001

(54) PROCESS FOR CONTROLLING THE COMMUNICATION FLOW WITHIN AN INTERACTIVE NETWORK

(75) Inventor: Alain Maillard, Paris (FR)

(73) Assignee: Thomson Licensing S.A., Boulogne Cedex (FR)

( * ) Notice: Under 35 U.S.C. 154(b), the term of this patent shall be extended for 0 days.

(21) Appl. No.: 08/990,402

(22) Filed: Dec. 15, 1997

(30) Foreign Application Priority Data

Dec. 27, 1996 (FR) .................................................. 96 16145

(51) Int. Cl.⁷ ....................................................... H04H 1/00
(52) U.S. Cl. ................................ 348/12; 348/13; 455/5.1
(58) Field of Search .......................... 348/12, 13; 455/5.1

(56) References Cited

U.S. PATENT DOCUMENTS 5,917,822 * 6/1999 Lyles et al. ............................ 370/395

FOREIGN PATENT DOCUMENTS 0696872A 2/1996 (EP) ................................ H04N/7/173

OTHER PUBLICATIONS

Radio Fernsehen Elektronik, vol. 43, No. 8. pp. 14–17, "Video On Demand", Aug. 1994.

IBM Technical Disclosure Bulletin, vol. 39, No. 2 pp. 157–161 "Analog Interactive Television System With Two Service Levels", Feb. 1996.

Communications–Rising to the Heights, Denvee Jun. 23–26, 1991 vol. 1, of 3 Jun. 23, 1991 IEEE, pp. 92–98 Tak–Shing Yum et al. Dynamical Channel Assignment in Integrated–Services Cable Networks.

* cited by examiner

Primary Examiner—Melvin Marcelo
(74) Attorney, Agent, or Firm—Joseph S. Tripoli; Robert S. Shedd; David T. Shoneman

(57) ABSTRACT

The invention relates to a process for controlling the flow of information exchanged between at least one station for transmitting interactive programs and a plurality of interactive terminals.

According to the invention, during each interactive program, each terminal is sent a group of data intended to set up a protocol for establishing interactive communications between said transmission station and said terminals.

11 Claims, 1 Drawing Sheet

PROCESS FOR CONTROLLING THE COMMUNICATION FLOW WITHIN AN INTERACTIVE NETWORK

BACKGROUND OF THE INVENTION

1. Field of the Invention

The present invention relates to interactive exchanges of information between at least one transmitter of audiovisual programs and services and a plurality of terminals linked to said transmitter within a communication network. The invention relates more particularly to a process for controlling the flow of information exchanged.

2. Description of the Prior Art

A structure for exchanging audiovisual information and service information between a transmitter and an interactive terminal generally includes a direct path, via which the interactive audiovisual programs and the services associated therewith are transmitted, and a return path via which one or more terminals can communicate interactively with the said transmitter. The direct path includes, in the case of an analog transmission, a modulator enabling information of the Teletex type for example to be inserted into the frame return lines (VBI: Vertical Blanking Interval) of an analog video signal. In the case of a digital transmission, a multiplexer allows the time-division multiplexing of packets of audio and video data, service data and private data for example according to the MPEG-2 standard.

In the example illustrated in FIG. 1, representing part of a network for exchanging audiovisual and services digital information transmitted by a source S, the direct path is made up of a multiplexer 1, a channel 2 for broadcasting audiovisual programs while the return path is made up of a telephone line 4 linking an interactive terminal 6 to a server 8 intended, on the one hand, for managing a database 10 in which information relating to the users of the interactive terminals are stored, and, on the other hand, for collecting and processing the information output by these terminals during communication with the program source S. The terminals may in particular be television receivers or microcomputers equipped to receive audiovisual programs.

These programs are generally received by a large number of users who may attempt, simultaneously, to establish a communication with the program source S. This results in congestion to the return path 4 and hence to poor usage of the period during which the communications with the source S are authorized. The graph of FIG. 2 represents the number e of tries at establishing communication with the source S as a function of time which are made simultaneously by several users. The capacity R of the network is represented on the ordinate axis by a horizontal bar above which no further call can reach the source S.

Moreover, interactive programs can be broken down into two types of applications: there are, on the one hand, first applications asking users for an almost real-time call (eg. an advertising slot lasting about 30 seconds, thus demanding that the reaction of the users of at least one particular profile be almost immediate) and, on the other hand, second applications for which the calls of the users can be delayed in time on account of the relatively long response time allowed by the program transmitter (eg. "If you would like a brochure, click on yes. Response period: 15 minutes").

Thus beyond a predefined duration starting from an initial reference instant $T_0$ specific to each application, the calls of the terminals are no longer taken into account by the source S. In point of fact, the various networks are more or less busy, depending on the day's schedules. By way of example, an audiovisual channel with a strong cinematographic component will see its audience increase considerably at the 8.30 p.m. screening if it broadcasts a cinematographic work, while the audience will certainly be smaller at 1 p.m. for the same channel. The aforesaid congestion, following a request, from the program transmitter, asking users to react, may thus form an obstacle to the participation of certain users whose profile is more inclined, for market research reasons for example, to be of interest to said program transmitter. Thus, in the above example, the managers of the channel, by preference targeting the profile of users who enjoy cinematographic works, cannot be certain that they have had the opportunity to transmit a call when the network schedule is busiest.

SUMMARY OF THE INVENTION

The object of the invention is to alleviate the prior-art drawbacks cited above by means of a process making it possible to control the flow of communications between the source S of interactive programs and the terminals receiving these programs, in which, during each interactive program, said source sends each terminal a group of data intended to set up a protocol for establishing interactive communications between the source and said terminals.

According to the invention, said group of data includes a period $\delta t$ during which each terminal is authorized to try to establish an interactive communication with the source and a datum P requiring a priority level associated with each terminal to be taken into account and positioning said interactive communication attempt at an instant situated within said period $\delta t$.

According to a particular embodiment, a priority level Pi associated with each terminal is determined in such a way as to split the terminals as a whole into sub-groups of terminals possessing the same priority, said sub-groups containing substantially the same number of terminals.

A further characteristic of the invention consists in said group of data furthermore including at least one datum C requiring at least one selection profile characterizing a sub-group of users of interactive terminals to be taken into account.

Another characteristic of the invention consists in said group of data comprising a maximum number M of tries authorized during said period $\delta t$.

These data allow optimum use of the duration for which the communications are authorized, by spreading the calls of the users more evenly over said duration and by allowing users whose selection profile is of interest primarily to the operators of network to have priority access to interactive communications.

BRIEF DESCRIPTION OF THE DRAWINGS

Other characteristics and advantages of the invention will emerge from the description of an example embodiment taken by way of non-limiting example with reference to the appended figures, in which.

DETAILED DESCRIPTION OF THE INVENTION

Figure 1:
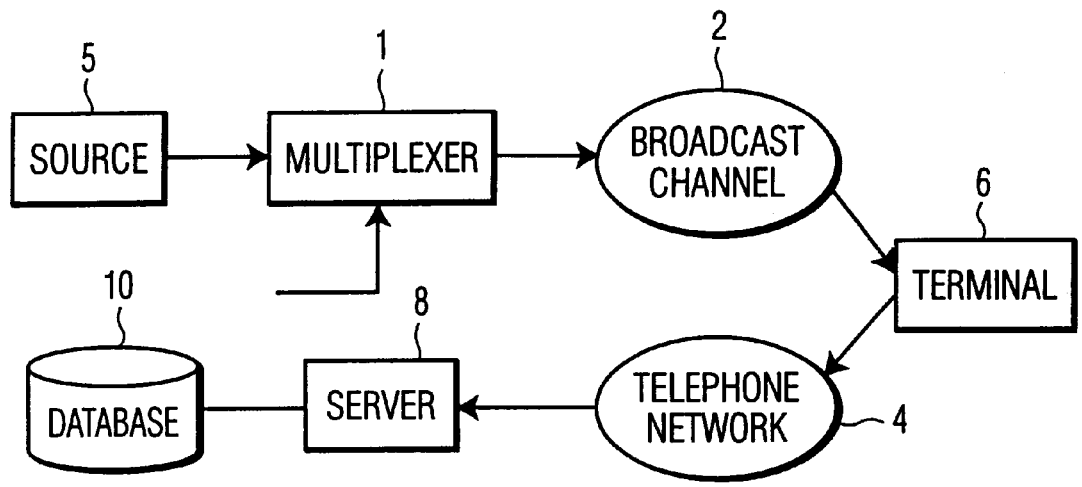
FIG. 1 represents diagrammatically and partially an interactive communication network.
Figure 2:
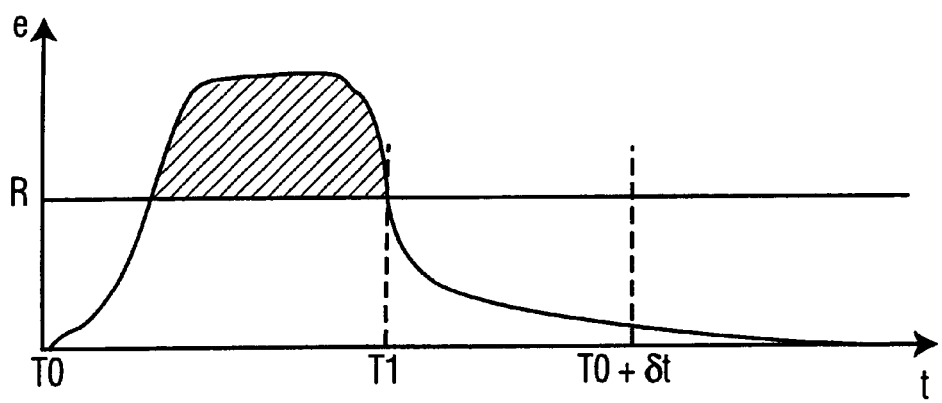
FIG. 2 illustrates diagrammatically an example of the use of the duration for which the communications with the transmission source are authorized.

Represented partially in FIG. 1 and already described briefly above, is a network for exchanging audiovisual and services information transmitted by a source S, a direct path being made up of a multiplexer 1 of the type predefined above and of a channel 2 for broadcasting audiovisual programs while a return path is made up of a telephone line 4 linking an interactive terminal 6 to a server 8 intended, on the one hand, for managing a database 10 in which information relating to the users of the interactive terminals are stored, and, on the other hand, for collecting and processing the information output by these terminals during communication with the program source S. The server 8 is a logic entity which may include one or more servers linked to one or more networks.

In a preferred application of the invention, at least one terminal consists of a television receiver.

According to a variant of the invention, the process is implemented in applications in which at least one terminal is a microcomputer which includes means for receiving interactive programs.

The terminals comprise, within the context of the present example, decoders for receiving the signals transmitted and modems for the return path. Furthermore, each terminal linked to the network includes a means of calculation, such as a microprocessor, associated with a means of storage or programmable memory, such as a flash, EPROM or E2PROM memory destined to store certain parameters. These parameters comprise at least a serial number and its address in the network. Moreover, said parameters can be programed by the constructor, by the dealer or, alternatively, by the network broadcaster (in the case, especially, of cabled or telephone networks) and, possibly, can be updated at any moment by the network. Furthermore, a datum is stored, in the programmable memory of the terminal, which constitutes a selection profile characterizing a user of this terminal.

In the case of the present example, during the transmission of an interactive program, the transmitter transmits a group of data comprising a period $\delta t$ during which each terminal is authorized to try to establish an interactive communication with the transmitter and a datum P requiring a priority level specific to each terminal to be taken into account and positioning said interactive communication attempt at an instant situated within said period $\delta t$.

According to an additional characteristic of the invention, each terminal includes an initial priority level derived from the serial number or from the address of the terminal. This priority level, which is a variable denoted by $P_0$, is stored in the means of storage of said terminal. The initial value of $P_0$ can be determined from the following equation $E_1$:

$$P_0 = I_d \text{ modulo } (N) \qquad E_1$$

where $I_d$ is an identification number specific to the terminal (especially, but not exclusively, the serial number or the address of the terminal on the network), N an integer representing the number of possible priorities, thus defining subdivisions of equal duration of the response period $\delta t$. Thus, N may be an integer which is stored in the terminal and is capable of being modified by the transmitter, and which can be updated as a function of the terminal population and of the capacity for receiving the calls of said terminals on the return path. The initial priority level $P_0$ is determined preferably during the powering-up of the terminal. In what follows, Pi will stand for the priority level of a terminal, Pi being able to take the values from 0 to N−1, this level varying in the manner described below.

Advantageously, the response of at least one user is made to at least one terminal which includes means for receiving interactive programs by means of at least one remote control.

According to a variant of the invention, this response may be made by means of at least one keyboard, for example a microcomputer keyboard. According to another variant, the user can respond to the interactive message appearing on a television screen or microcomputer screen by pressing on at least one icon displayed on said screen, this screen being of the touch-screen type known in other applications.

The process according to the invention operates in the following manner:

During the transmission of a transmission accompanied by an interactive program, the terminal receiver displays the transmission and executes the interactive program. Typically, this program presents a message intended for the user and which asks him to react in one way or another. This message can, among other things, be presented in visual form on the screen of the terminal, in the form of an audible signal, in the form of a data sequence, or as a combination of these three forms. In the subsequent description, consideration will be given, as a non-limiting example, to a visual interactive message appearing on the television screen. By way of illustration, an interactive audiovisual message displayed on a screen may be of the type: "To receive a brochure, press the I-TV button" (I-TV standing for Interactive TV) or else "Vote: yes/no".

In the case of the example of the first message, the call period allowed the user may, for example, be "infinite", this corresponding to the transmission of the parameter $\delta t=0$ in the interactive program. This situation occurs in the case where no control of the flow of data is instigated by the program transmitter. In this first case, the flows are then controlled in accordance with the method for managing the flows of the software of the terminal itself, the transmitter not seeking in this case to impose a particular management strategy dependent upon the broadcast transmission.

By contrast, in the case of the example of the second message, a period may be imposed by the program transmitter, a period beyond which no call is taken into account. This case corresponds to the situation where $\delta t \neq 0$ and will condition management of the call attempts of the terminal, involving the other data sent to the terminal by the program transmitter.

Among the parameters transmitted together with the interactive program, the flag P indicates to the terminal how its priority Pi should be taken into account in order to determine the instants at which it can make its call attempt or attempts. Two cases may be envisaged, depending on the value of the flag P.

In the two specific cases which may be envisaged, the terminal may have to determine an instant Ti within the time interval $\delta t$.

A clock internal to each terminal supplies the value of the reference instant To corresponding to the start instant of the period $\delta t$. The instant Ti is calculated according to the following equation E2:

$$Ti = T\text{clock} + (Pi * T) \qquad E_2$$

where T=$\delta t$/N, Pi represents the current priority level of the terminal and Tclock represents the value of the internal clock at the moment at which Ti is calculated.

The internal clock supplying To and Tclock is for example synchronized with a clock of the transmitter, for example the so-called SCR ("System Clock Reference") clock defined in the MPEG2 standard, and the values of which are transmitted in the multiplex. To is for example the value of the internal clock at the moment the interactive program is received, or else a further parameter transmitted by the transmitter.

N determines the number of subdivisions which it is desired to give to the time interval δt and consequently the number of different priority values.

If P=0, then the first call attempt will be made at the instant $T_i$ defined above. If the attempt does not succeed, then a new value of Ti is calculated and a new attempt is made, until Ti exceeds the period δt or until the maximum number of attempts M is reached.

If P=1, then no control is applied to the first call attempt: it is made as soon as possible, namely as soon as the user has provided the expected responses. If this first call fails, a second attempt is made at the instant Ti. If this second attempt fails, a new try is made, and so on, as above.

When an attempt succeeds or when the period δt is exceeded, when the datum P has the value 0 or 1, the number $P_i$ indicating the level of priority of the terminal is updated according to the equation:

$$P_i(n+1) = (P_i(n)+1) \text{ Modulo } (N)$$

$P_i(n)$ representing the current priority level at a given instant, $P_i(n+1)$ representing the priority level after a successful attempt or after exceeding the period δt.

By contrast, when the maximum number of calls is reached, the priority remains the same.

Thus, the call attempts made by terminals whose priority Pi is small are closer together than in the case of those terminals whose priority Pi is high. The frequency of the call attempts of the terminals with small priority is increased, thus increasing the probability of a successful call.

The datum P makes it possible to anticipate an overload on a network: thus, it allows the use of a selection criterion, which is the priority in the case of a network overload, without taking the profile of the user into account. By way of example, with regard to a little-known channel, it is very probable that at 1 p.m. all calls will get through, and hence the datum P will be set to 0. Conversely, with regard to a large-audience channel, it is unlikely that all calls will get through to the source, and the datum P will therefore be set to 1.

To return to the example above-mentioned, when transmitting an interactive program during the broadcasting of a cinematographic work, the program transmitter will probably be interested primarily in "film-buff" TV viewers. Accordingly and advantageously, a parameter C sent by the source/transmitter S is equal to 1, indicating to the terminal that it should determine whether the or a user profile stored in the means of storage of the terminal possesses characteristics in common with a profile transmitted together with the interactive program. Thus, in the above example, if the parameter C is set to 1 by the source S, a "film-buff" TV viewer will have priority access to transmit a call over the return line. Here, "priority access" signifies that the terminal is authorized to attempt communication with the server of the transmitter as soon as possible, namely as soon as the user has supplied the datum or data required by the program. After successful access to the return line or after expiry of the period δt, the priority of said terminal reverts to its value preceding its call.

Alternatively, if the datum C is equal to zero, the call of the terminal is not conditioned by its user profile.

It is now apparent that, regardless of the nature of the communication network, the invention does enable the set aims to be achieved, namely to provide a process for controlling the flows of calls of interactive terminals to the source S of programs so that they are managed in an optimum manner as a function, on the one hand, of the capacity of the network and, on the other hand, of the profiles of the users of said terminals.

Of course, the invention may be extended to types of networks of the MMDS, LMDS or MVDS type, to any type of interactive terminal, of means for collecting interactive information and of means of operation intended for transmitting the user's response to the terminal.

What is claimed is:

1. Process for controlling the flow of information exchanged between at least one transmitter of interactive programs and at least two interactive terminals, in which, during at least one interactive program, said transmitter sends each terminal a group of data intended to set up a protocol for establishing interactive communications between the transmitter and said terminals, characterized in that said group of data includes a period Δt during which each terminal is authorized to try to establish an interactive communication with the transmitter and a datum P requiring a priority level Pi associated with each terminal to be taken into account and positioning said interactive communication attempt at an instant situated within said period δt.

2. Process according to claim 1, characterized in that the priority Pi of each terminal is determined in such a way as to split the terminals as a whole into sub-groups of terminals having the same priority, said sub-groups containing substantially the same number of terminals.

3. Process according to claim 1 characterized in that the call attempts made by terminals whose priority Pi is small are closer together than in the case of those terminals whose priority Pi is high so that the frequency of the call attempts of the terminals with small priority Pi is increased, thus increasing the probability of a successful call.

4. Process according to claim 1 characterized in that said group of data furthermore includes at least one datum C requiring at least one selection profile characterizing a sub-group of users of interactive terminals to be taken into account.

5. Process according to claims 1 characterized in that said group of data comprises a maximum number M of tries authorized during said period δt.

6. Process according to claim 4 characterized in that the following steps are carried out:

if C=1, and if the user profile stored in a means of storage of the terminal possesses at least one characteristic in common with a profile transmitted together with the interactive program, then the terminal is authorized to attempt a communication with the transmitter as soon as possible with priority access to the network, namely as soon as the user has provided the datum or data required by the program, the priority of said terminal reverting to its value preceding its call after successful access to the return line or after expiry of the period δt, if C=0, the call of the terminal is not conditioned by its user profile.

7. Process according to claim 1 characterized in that the terminal determines an instant Ti within the interval of time δt at which said terminal will be authorized to make a call on the return line towards the transmitter and calculated according to the following equation $E_2$:

$$Ti = T\text{clock} + (Pi*T) \qquad E2$$

where T=δt/N, N an integer representing the number of possible priorities in the interval δt, thus defining subdivisions of equal duration of the period δt, Pi representing the current level of priority of the terminal, a clock internal to each terminal supplying the value of the reference instant To corresponding to the start instant of the period δt and Tclock representing the value of the internal clock at the moment at which Ti is calculated.

8. Process according to claim 7, characterized in that, following receipt of said group of data by the terminal, the following steps are carried out:

if P=0, then the first call attempt will be made at the predefined instant Ti, a new attempt being made if the attempt does not succeed, given that a new value of Ti is calculated, at each repeat, until Ti exceeds the period δt or until the maximum number of attempts M is reached, if P=1, then no control is applied to the first call attempt, the latter being made as soon as possible, namely as soon as the user has provided the expected responses, a repeat of the call attempts being made at the instant Ti after a failed attempt.

9. Process according to claim 7 characterized in that each terminal includes an initial priority level which is a variable denoted by Po stored in a means of storage of said terminal and which can be determined from the following equation E1:

$$Po = Id \text{ Modulo } (N) \quad\quad E1$$

where Id is an identification number specific to the terminal.

10. Process according to claim 7, characterized in that the priority level Pi of the terminal is updated according to the equation:

$$P_i(n+1) = (P_i(n)+1) \text{ Modulo } (N)$$

$P_i(n)$ representing the current priority level at a given instant, $P_i(n+1)$ representing the priority level after a successful attempt or after exceeding the period δt.

11. Process for controlling the flow of information exchanged between at least one transmitter of interactive programs and at least two interactive terminals, in which, during at least one interactive program, the transmitter sends each terminal a group of data intended to set up a protocol for establishing interactive communications between the transmitter and said terminals, characterized in that said group of data includes a period δt during which each terminal is authorized to try to establish an interactive communication with the transmitter, a maximum number M of tries being authorized during said period δt, a datum P requiring a priority level Pi associated with each terminal to be taken into account at an instant situated within the period δt, and at least one datum C requiring a selection profile characterizing an interactive terminal user sub-group to be taken into account.

* * * * *